SOLAR FLARE DETECTION APPARATUS

Filed March 27, 1967 3 Sheets-Sheet 1

INVENTORS
SOL LOUIS MORRISON
SEYMOUR KASS
BY Darby & Darby
ATTORNEYS

Jan. 20, 1970 SOL LOUIS MORRISON ET AL 3,491,242

SOLAR FLARE DETECTION APPARATUS

Filed March 27, 1967 3 Sheets-Sheet 2

INVENTORS
SOL LOUIS MORRISON
SEYMOUR KASS
BY Darby & Darby
ATTORNEYS

Jan. 20, 1970 SOL LOUIS MORRISON ET AL 3,491,242

SOLAR FLARE DETECTION APPARATUS

Filed March 27, 1967 3 Sheets-Sheet 3

INVENTORS
SOL LOUIS MORRISON
SEYMOUR KASS

BY Darby & Darby
ATTORNEYS

United States Patent Office 3,491,242
Patented Jan. 20, 1970

3,491,242

SOLAR FLARE DETECTION APPARATUS

Sol Louis Morrison, Seaford, and Seymour Kass, Syosset, N.Y., assignors to Fairchild Hiller Corporation, Farmingdale, N.Y. a corporation of New York Filed Mar. 27, 1967, Ser. No. 626,179
Int. Cl. H01j *39/12;* G02f *1/28*
U.S. Cl. 250—217 7 Claims

ABSTRACT OF THE DISCLOSURE

Detection of solar flares by means of a television camera in combination with a Lyot filter to determine when the intensity of the image of the same surface exceeds a predetermined threshold which may be variable.

Figure 1:
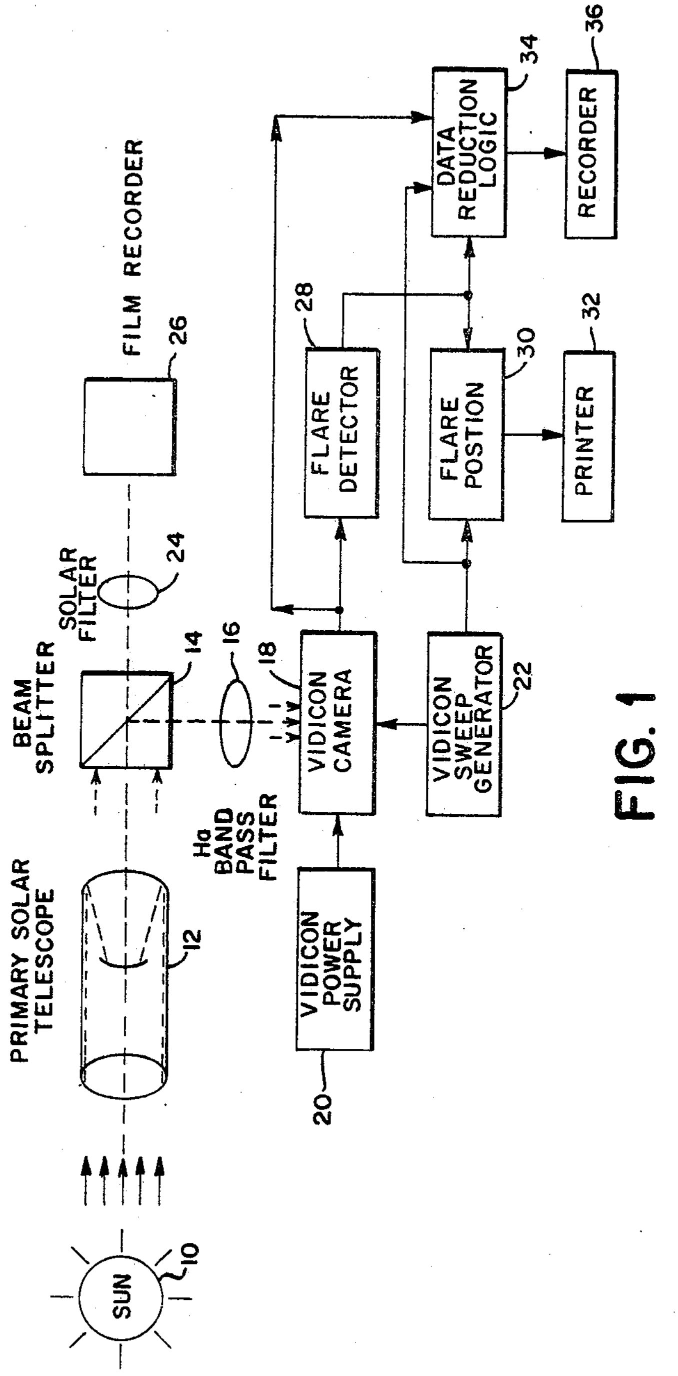

The present invention pertains to the detection of solar flares and, in particular, to an electronic system for obtaining data pertaining to solar flares automatically and on a real-time basis.

The collection of data pertaining to solar flares has become increasingly important now that travel in space has become a reality. Presently, flare patrol stations exist which photograph the sun about every thirty seconds to detect the presence of such flares. These photographs must be painstakingly analyzed in order to obtain important quantitative data pertaining to the existence of solar flares. Such data, for example, may include the location of the flare, its peak intensity and integrated brightness (with respect to area), and the variation of these quantities with time.

Because of the large amount of raw flare data produced by prior art techniques, and the laborious manual reduction required, only a small fraction of the solar flares occurring can be analyzed in depth and, more important, the quantity of reduced data from which improved flare predicting methods can be evolved is limited.

Accordingly, the main object of the present invention is to provide apparatus for automatically analyzing data relating to solar flares.

Another object is to provide apparatus for analyzing solar fires which operates on a real-time basis.

Another object of the invention is to provide flare detection apparatus which will always operate on a uniform and objective basis.

Still another object of the invention is to facilitate realization of a full-time, real-time network of unmanned observation stations, economically maintainable in remote areas of the world, for detecting and analyzing solar flares.

Briefly, the above and other objects of the invention are accomplished by televising the sun's surface through a Lyot filter and electronically detecting when the intensity of the image exceeds a predetermined threshold, which itself may be variable, depending upon atmospheric conditions. Flare position means responsive to the synchronizing pulses from the television camera, indicates in terms of X–Y coordinates the location of a flare, and this information, together with the time of occurrence of the flare, may then be suitably recorded in any desired fashion. In addition, special circuits are provided to indicate the area occupied by the flare, the integrated brightness of the flare, and the peak brightness of the flare. This information may also be recorded to provide a permanent record of these parameters.

In the drawings:

FIGURE 1 is a block diagram of the invention; and

Figure 2A:
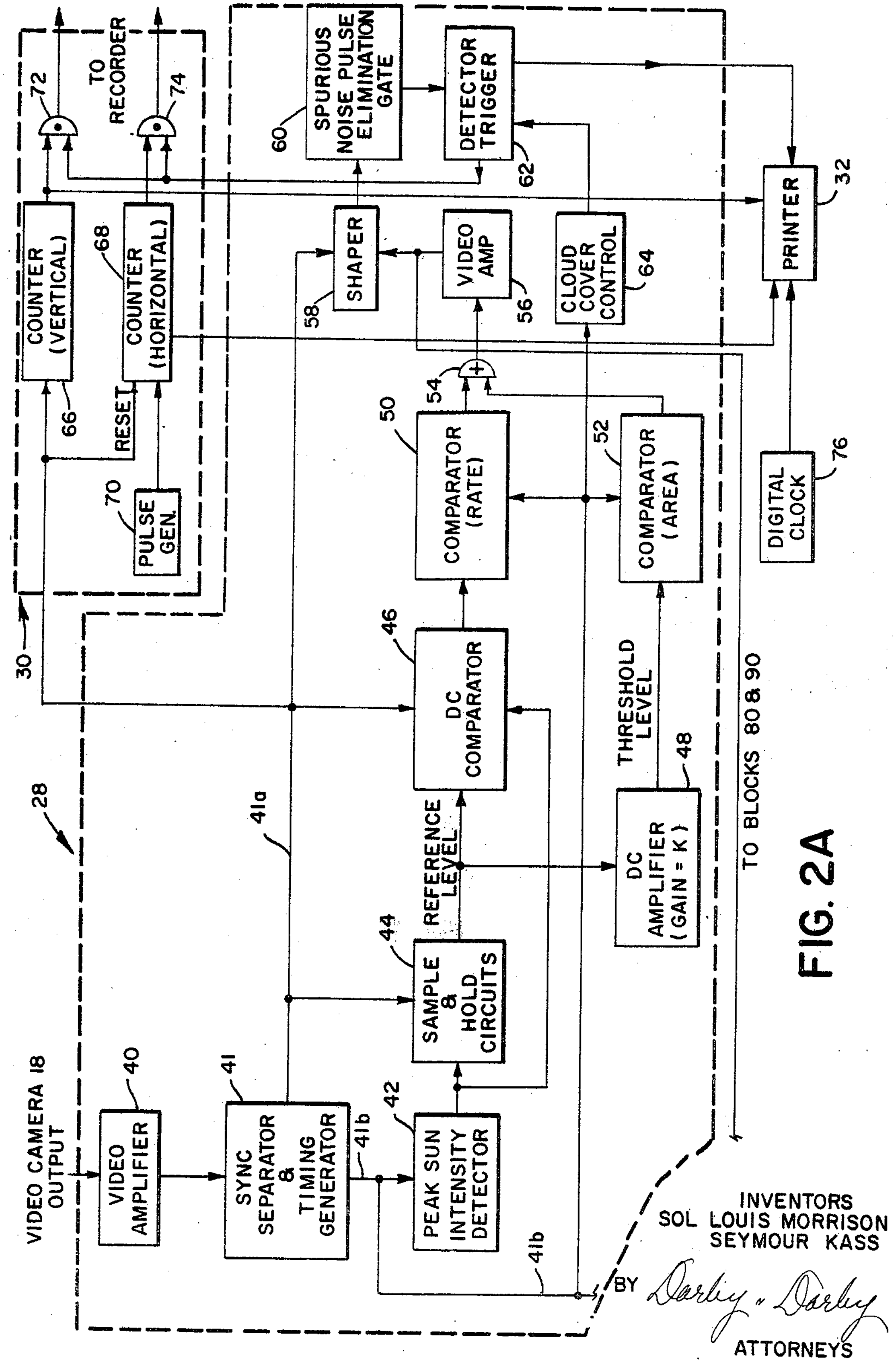
Figure 2B:
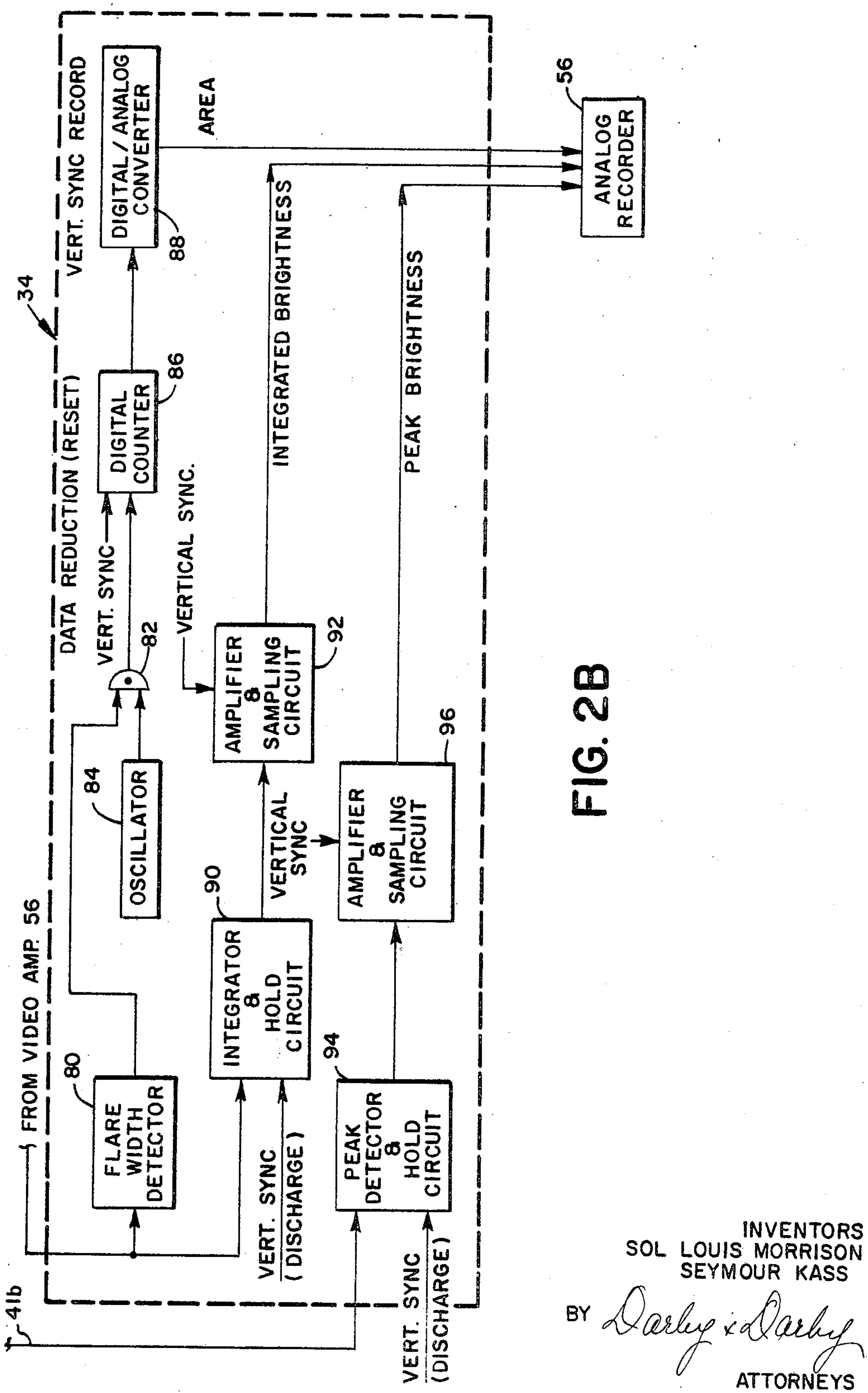

FIGURES 2A and 2B comprise a detailed block diagram of the circuit illustrated in FIGURE 1.

In FIGURE 1, the sun is represented at 10, and a solar telescope is shown schematically at 12. A beam splitter

14 couples a portion of the optical information through a Lyot filter 16 which passes only the hydrogen-alpha spectral band to a television camera such as a Vidicon camera 18. The camera 18 is powered by a power supply 20 and swept by a conventional sweep generator 22, which produces the standard horizontal and vertical synchronizing pulses (hereinafter sync pulses) used in commercial television. The construction to this point and the desirability of using the hydrogen-alpha spectral band for solar flare detection are discussed in application S.N. 307,048, filed Sept. 6, 1963, now Patent No. 3,320,427, having the same assignee as the instant application.

Beam splitter 14 may have two optical outlets, the second of which would be fed through a Lyot filter 24 to a film recorder 26 to maintain a permanent record of the sun's surface. These latter elements 24 and 26 form no part of the present invention.

In accordance with the invention, the output of the Vidicon camera 18 is coupled to a flare detector 28, the output of which along with the horizontal and vertical sync pulses from sweep generator 22 are coupled to a flare position indicator 30. Flare detector 28, as explained in greater detail below, compares the output of the Vidicon camera 18 (indicative of optical intensity) with a reference threshold level, producing a signal when the output of camera 18 exceeds this threshold level. Thus, the output of detector 28 indicates that a solar flare has been detected. The flare position indicator 30, in response to horizontal sync pulses from sweep generator 22, produces digital signals representative of the X and Y coordinates of the Vidicon beam position at any given point. Thus, when flare detector 28 detects the presence of a flare, an enabling signal is applied to the flare position indicator 30, which couples these digital signals to a printer 32 to indicate the X–Y coordinates of the flare.

The output of the Vidicon camera 18 and sweep generator 22 are also coupled to data reduction logic circuit 34, which is responsive to the output of the flare detector 28. In a manner described below, data reduction logic 34 produces information indicative of the area of the flare, and the integrated brightness and peak brightness of the flare. This information is then coupled to recorder 36, where a permanent record is made.

A more detailed block diagram of the invention is shown in FIGURES 2A and 2B. All of the components in FIGURES 2A and 2B are well known and for this reason are only disclosed in block diagram form. Those parts corresponding to elements described with reference to FIGURE 1 are indicated by the same numeral.

The present invention can readily employ standard television techniques, which are well known and therefore not described in detail. By way of example, commercial television scans 525 horizontal lines per frame, and 30 frames per second. Each of the horizontal lines is initiated by a horizontal sync pulse and the separate frames are initiated by the respective vertical sync pulses. In this specification, "horizontal sync pulse" and "vertical sync pulse" refer respectively, to pulses initiating the beginning of each horizontal sweep and each new frame. This nomenclature is used primarily to establish a scan reference and is not intended as limiting in any other respect. The invention, of course, is not limited to any particular scanning system.

The output of the camera 18 is coupled to a standard sync separator and timing generator 41, which separates the sync signals (on line 41*a*) from the video information signal (on line 41*b*). The video information signal is passed to a peak sun intensity detector 42, which may comprise a capacitor across which a voltage is developed indicative of the brightest point in the flareless image of a particular frame. The purpose of detector 42 is to develop a reference level which will be independent of atmospheric conditions so that the occurrence of flares can be compared correctly with the adjacent background of the sun. The time constant of the capacitor of detector 42 must be short enough so that the capacitor will respond to plage areas of the sun, but long enough to prevent a change in average intensity in response to the detection of a flare. The discharge time constant of the capacitor in detector 42 should be long enough so that the capacitor will hold the peak voltage charge for a full vertical sweep. Sampling of the voltage stored in detector 42 may occur during the vertical blanking time, which can be divided into two parts, a sampling interval T1 and a discharge interval T2. After the charge has been built up in detector 42, it is transferred to a sample and hold circuit 44 during time T1 and thereafter discharged during time T2.

The sample and hold circuit 44 comprises a large capacitor which maintains the peak voltage level from detector 42 for a relatively long period of time (e.g. one minute). Thus, the voltage level from circuit 44 establishes the threshold level during each vertical trace (i.e. for a given frame) and remains constant until the next sampling operation for the next frame.

The reference level output of the hold circuit 44 is coupled to a DC comparator and switch 46 and a DC amplifier 48. The comparator 46 compares the outputs of detector 42 and hold circuit 44, which are integrated voltages and relatively noise-free compared with the direct video output of amplifier 40. Hence, comparator 46 is relatively sensitive and capable of detecting flares with low rise rates. When a difference voltage theshold is exceded, the output of comparator 46 is a low voltage level which is coupled to a rate comparator 50 as described below.

The DC amplifier 48 sets a threshold level for an area comparator 52, which receives as a second input the video information signals on line **41*b*. When the level of these signals exceeds the preselected threshold level, comparator 52 produces an output which is coupled through an OR gate 54 to a second video amplifier 56. The gain K of amplifier 48** is the threshold ratio, or the ratio of flare intensity to sun peak intensity required to indicate a flare.

The purpose of the rate comparison is to detect flares having such a slow rise rate that they might possibly have a tendency to raise the threshold level from amplifier 48 rather than to penetrate it and be detected. However, the flare rise rate will always be more rapid than the rate of total image brightness increase, due to atmospheric factors such as haze or solar altitude. Hence, the rate comparator 50 is capable of detecting a low rise rate for large flares. For example, if the minimum difference between the two inputs to comparator 50 were five percent of the reference level over one minute, and the Vidicon transfer characteristic were equal to .65, then it can be shown that the minimum rise rate detectable as a flare would be twenty percent per minute relative to the chromospheric background. Since these factors are controllable, it is feasible to arrive at different values for satisfactory flare detection on a rate basis.

Video amplifier 56 may have a gain of approximately 40 db and a band width of ten megacycles. By way of example, the video signal caused by a solar flare may be fifteen millivolts above the threshold detection level in order to produce a satisfactory output from video amplifier 56.

The output of amplifier 56 is coupled to a shaper 58 which produces a pulse output when the video amplifier output reaches a desired level. Gating pulses from the sync separator and timing generator 41 may be also applied to shaper 58 to mask the outburst of noise pulses occurring in the camera system at the beginning and end of the vertical/horizontal sweeps.

The output of shaper 58 is applied to a gate 60 which eliminates spurious noise pulses by, for example, requiring the presence of a voltage from shaper 58 on two consecutive horizontal scans. Moreover, it would be a simple matter using state-of-the-art techniques, to also require that the difference between the horizontal positions corresponding to a given signal be within a specified maximum limit. These conditions would be satisfied for a flare, but the probability of their existing by virtue of random noise would be extremely low.

The output of gate 60 triggers a detector 62, the output of which indicates the presence of the flare. Detector trigger 62 remains in its triggered condition (once it has been triggered) until a complete frame has been completed, at which time it is reset.

The operation of trigger 62 is enabled or inhibited by cloud cover control 64. If the sun is obscured by a cloud (for example) the reference voltage output of the circuit 44 would drop to background level, actually appearing black in hydrogen alpha emission. When the sun again came into view, the initial bright view would look like a flare against the decreased reference level. Thus, the cloud cover control inhibits the operation of detector trigger 62 in order to handle this possibility. When the image returns, the cloud cover control 64 maintains the detector inhibited until a pre-set minimum image brightness level is reached. This may be measured by an average direct voltage level within the cloud cover control, generated by a conventional integrating circuit operating over the envelope of the vertical scan.

The flare position circuit 30 includes a vertical counter 66 and a horizontal counter 68. Counter 66 counts the horizontal sync pulses on line **41*a* so that the count stored therein is representative of the vertical position of the horizontal line. The horizontal counter 68 is responsive to pulses from a pulse generator 70 and is reset at the occurrence of each horizontal sync pulse. Thus, for example, if 100 pulses are fed from pulse generator 70 to the counter 68 during each horizontal scan, the count stored in counter 68 at any given moment will represent the horizontal position of the Vidicon beam. Accordingly, when a flare is detected, the detector trigger 62 enables a pair of AND gates 72 and 74 coupling the outputs of the counters 66 and 68 to the printer 32, thereby recording the X–Y coordinates of the flare position. The printer 32 may also be responsive to the output of a digital clock 72** so that time is also recorded adjacent to the coordinates of the flare.

The data reduction logic 34 is shown in FIGURE 2B. It is recalled that the information herein recorded is stored on a frame-by-frame basis. The information pertaining to the area of the flare is derived directly from the output of video amplifier 56, which is coupled to a flare width detector 80. Detector 80 is a shaper-type circuit producing a square wave output lasting for the duration of the flare on a particular horizontal scan. An AND gate 82 is enabled by the output of the flare width detector 80 to pass pulses from an oscillator 84 into a digital counter 86. Counter 86 is reset at the beginning of each frame by the vertical sync pulse, and the cumulative flare width count for each frame is coupled through a digital-to-analog converter 88 to the analog recorder 36. Since there is a predetermined number of lines per frame, this cumulative count is inherently related to area. The converter 88 is also enabled once after each frame by the vertical sync pulse to convert the digital representation of area in counter 86 to the signal to be transferred to the recorder 36.

The integrated brightness signal is also derived from the output of video amplifier 56, which in this case is coupled to an integrator and hold circuit 90. Integrated brightness is a measure of the total radiated energy of the flare within the band width of the Lyot filter, and may be mathematically characterized as $\int IdA$, where I is intensity and A is flare area. The output of the integrator 90 is amplified by amplifier 92, which is sampled by the vertical sync pulse once during each frame to couple a voltage to recorder 36 indicative of integrated brightness.

Any number of integrating circuits may be used as the integrator 90 to develop a voltage proportional to the voltage time integral of the incoming signal from amplifier 56. For example, a large sink-like capacitor receiving the signal would function as integrator. The rise in voltage of such a capacitor over the time in which the signal is impressed on it would be proportional to the desired integral if the rise is small relative to the signal voltage so as not to impede charge build-up. The amplifier and sampling circuit 92 would empty the sink-capacitor, processing the voltage level equivalent to the charges for read-out on demand as integrated brightness. The capacitor would then be discharged after each frame by a vertical sync pulse.

The input to the peak brightness circuit is video information on line **41*b* from the sync separator 41. This signal is coupled to a peak detector and hold circuit 94 which may comprise a diode and capacitor smaller than the capacitor of integrator 90, which develops a charge equivalent to the maximum impressed voltage. An amplifier and sampling circuit 96 would then process this voltage during each frame to permit the peak brightness to be recorded by recorder 36**.

With the arrangement as illustrated and described in FIGURES 2A and 2B, flares appearing anywhere on the sun are counted as a single event, which is generally acceptable. However, during an active year of the solar cycle it would not be uncommon for multiple flares to exist simultaneously on the sun's surface. The present invention would lend itself particularly well to minor modifications to handle this possibility. For example, a "rectangular gate" could be established around each flare to isolate the area within each rectangle from the rest of the solar image. The gate could be displayed on a monitor so an operator could see the relationship to the flare within it. Control of location and size of the gate by the operator would also be possible to assure that the flare does not outgrow the rectangle.

Detection of the first flare automatically would position a rectangle around it, initially $\frac{1}{10}$ solar diameter on a side (corresponding to 5000 millionths of the solar hemisphere, exceeded by practically no flares). Only when the scanning beam of the Vidicon is within the rectangle would the first data collector channel be energized. When a second flare occurs outside the first rectangle, a second rectangular gate would be established; but if the second flare occurred within the first rectangle, it would be considered part of the first flare. It is not unusual for a flare to exist in separate segments.

When the scanning beam is within the second rectangle, data collection would proceed in a second channel independent of the first. Third and fourth channels are similarly activated in order, as required. The duty of an operator would be primarily to keep all flares enclosed by the rectangular gates while data is automatically taken. Since location of the gate boundaries would not be critical, analog means could be used to establish them at considerable saving in complexity.

It may eventually be desirable to convert the two-dimensional data obtained from the solar image to data descriptive of events on the three-dimensional sun. For this the X–Y coordinates of the scanned image must be transformed into heliographic coordinates, involving knowledge of the sun's axial inclination and the relationship to the ecliptic position of the earth. The corrected flare area furthermore must be obtained, not only from the foreshortened area and X–Y coordinates, but also from such information as mean radial height of flares based on past experience. Such conversions could be automatically handled by additional computer facilities of standard type which would accept the system data directly together with external data set-in. This reduced data would also be avaliable on a real-time basis for rapid interpretation if required. Specific numerical criteria could further be applied to the reduced data to determine the class of the flare on an objective, repeatable basis.

What is claimed is:

1. Solar flare detection apparatus comprising, filter means having a predetermined bandwidth, television camera means for scanning a solar image through said filter means, a video amplifier connected to the output of said television camera, means for comparing the output of said video amplifier with a reference level, and means responsive to said comparison means for producing an electrical signal indicative of the presence of a solar flare within said image.

2. Solar flare detection apparatus according to claim 1, including means responsive to said signal producing means for indicating the position of said flare within said solar image.

3. Solar flare detection apparatus according to claim 1, including means responsive to said comparison means for generating a signal representative of the area occupied by said solar flare with respect to said solar image.

4. Solar flare detection apparatus according to claim 1, including means responsive to said comparison means for measuring the total radiated energy of a flare within the bandwidth of said filter.

5. Solar flare detection apparatus according to claim 1, including means for indicating the peak brightness of a solar flare within said solar image.

6. Solar flare detection apparatus according to claim 1, including means for varying said reference level as a function of the average optical intensity of the image received by said camera.

7. Solar flare detection apparatus according to claim 6, including means for indicating the presence of a solar flare as a function of the difference in intensity of a flare and the adjacent image background.

References Cited

UNITED STATES PATENTS

| | | | |
|---|---|---|---|
| 2,764,698 | 9/1956 | Knight | 250—203 X |
| 2,999,184 | 9/1961 | Hansen | 250—217 X |
| 3,320,427 | 5/1967 | Evans et al. | 250—203 X |
| 3,321,630 | 5/1967 | Durig et al. | 250—226 X |

WALTER STOLWEIN, Primary Examiner

U.S. Cl. X.R.

250—214; 356—186